Jan. 19, 1926. 1,570,063
H. R. HOLMES
SPRING SEAT FOR TRUCKS AND AUTOMOBILES
Filed Oct. 16, 1924

Inventor
Harleigh R. Holmes.
By A. J. O'Brien
Attorney

Patented Jan. 19, 1926.

1,570,063

UNITED STATES PATENT OFFICE.

HARLEIGH R. HOLMES, OF LITTLETON, COLORADO.

SPRING SEAT FOR TRUCKS AND AUTOMOBILES.

Application filed October 16, 1924. Serial No. 743,934.

*To all whom it may concern:*

Be it known that I, HARLEIGH R. HOLMES, a citizen of the United States, residing at Littleton, county of Arapahoe, and State of Colorado, have invented certain new and useful Improvements in Spring Seats for Trucks and Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to spring seat construction.

The ordinary truck and automobile is provided with seats having a back cushion that is stationary with respect to the automobile body and a spring seat cushion which rests upon a support that is also stationary with respect to the automobile body. As the seat cushions are provided with springs which yield, and since the driver or the passenger sits upon the seat cushion, it is evident that there will be relative movement between the back cushion and the occupant of the seat, who, if he rests his back against the back cushion, will produce a friction which soon wears out the cushion and the occupant's clothes.

When trucks are provided with seats of the type referred to, the driver soon learns that he cannot, with any degree of comfort, rest his back against the back cushion and, therefore, derives no benefit therefrom.

It is the object of this invention to so construct an automotive vehicle seat that the occupant thereof may make full use of the back cushion without subjecting it or his own clothes to excessive wear nor himself to discomfort.

My invention, briefly described, consists in forming the seat in two parts, one being a frame that rests upon the automobile body frame and the other a similar framework supported from the first one by means of springs, and having secured to one side thereof a back cushion. The seat cushion rests upon the frame to which the back cushion is secured. By this means the occupant has the benefit of the spring action without being subjected to rubbing action due to the relative movement of the surface of the seat cushion and the back cushion.

My invention can be most clearly described and will be most readily understood when reference is had to the accompanying drawing, in which the preferred embodiment thereof is illustrated, and in which.

Figures 1, 2, 3, 4:
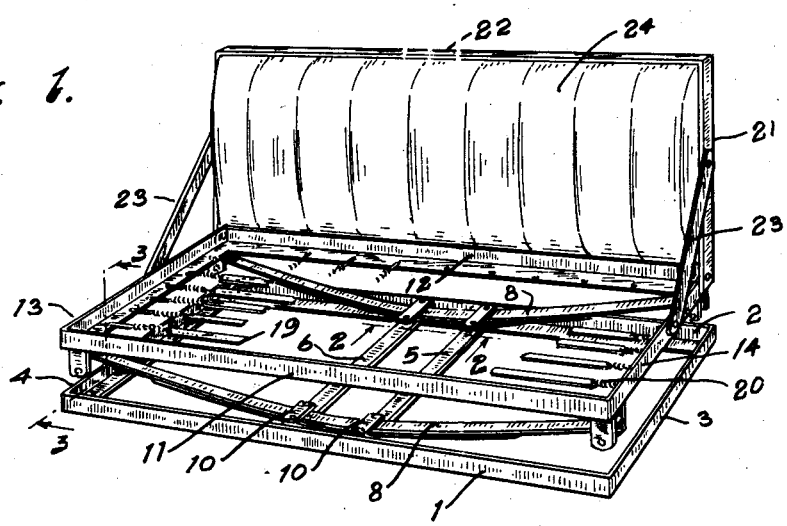
Fig. 1 is a perspective view of my improved seat showing the same with the seat cushion removed and a portion of the bottom of the seat cushion support broken away.
Fig. 2 is a detail taken on line 2—2, Fig. 1.
Fig. 3 is a view taken on line 3—3, Fig. 1.
Fig. 4 is a section taken on line 4—4, Fig. 2.

The seat consists of a rectangular frame of angle iron consisting of sides 1, 2 and ends 3, 4. The sides and ends are preferably welded so as to form a rigid rectangular structure. Midway between the end pieces 3 and 4, I secure two transverse pieces 5 and 6, which serve as tie-rods for the side members 1 and 2 and as supports for the blocks 7. The blocks 7 have their upper sides concave and support the springs 8, which are clamped thereto by means of bolts 9 whose upper ends pass through the transverse bars 10.

The seat proper comprises a second framework comprising sides 11, 12 and ends 13, 14, preferably welded together at the corners. Near each end of the end bars 13 I secure a U-shaped bracket 15 by means of rivets 16. A bolt 17 extends between the arms of each bracket and serves as a pivot for a pair of shackle links 18 between and to which the ends of the springs are connected.

The sides 11, 12 and ends 13, 14 are connected by means of transverse straps 19 and springs 20, upon which the seat cushion (not shown) rests. Secured to the rear ends of end members 13 and 14 are vertical members 21 whose upper ends are joined by an angle 22. Braces 23 connect the vertical members 21 with the end members 14 and hold the frame 21, 22 in vertical position. A back cushion 24 is secured in place on frame 21, 22.

The seat, described above, is substituted for the ordinary seat and back cushions of a truck or other automobile vehicle. The occupant of this improved seat has a comfortable seat to sit on and has the benefit of the springs 8, as well as the springs 20. It is evident that since the seat cushion is not depended upon to furnish the spring action and can therefore be made without springs, the occupant may lean against the back cushion 24 without danger of wearing out his clothes or the cushion, and without causing the discomfort that is experienced in seats where the seat cushions are provided with springs.

Although my seat may be employed in connection with ordinary automobiles as well as with trucks, it is, however, in connection with trucks that my seat finds its greatest field of usefulness, as trucks have, of necessity, very stiff springs that are of little or no effect in making it ride easy in the sense in which springs on ordinary passenger cars function. On trucks, therefore, the driver and passengers must depend upon the springs in the seat construction for the elimination of shocks and vibrations, and it is for this reason that the usual seat construction is unsatisfactory.

Having now described my invention, what I claim as new is:

A seat for automotive trucks, comprising, in combination, a substantially rectangular frame of angle iron adapted to rest upon the truck body, said frame being arranged with one flange of the angle irons lying in the plane of the bottom of the frame, a pair of transverse bars (5 & 6) extending from the flange of one longitudinal member to the corresponding flange on the other longitudinal member, a semi-elliptical spring secured at its center portion to the ends of said transverse bars, said springs extending parallel with the side angles of the frame, said springs having their convex sides down, a second frame of substantially the same size and shape as the first frame adapted to be supported from the ends of said springs by shackles (18) which are pivoted to the ends of U-shaped brackets (15) by means of a bolt (17).

In testimony whereof I affix my signature.

HARLEIGH R. HOLMES.